United States Patent
Lee et al.

(10) Patent No.: US 10,262,218 B2
(45) Date of Patent: Apr. 16, 2019

(54) SIMULTANEOUS OBJECT DETECTION AND RIGID TRANSFORM ESTIMATION USING NEURAL NETWORK

(71) Applicant: QUALCOMM Incorporated, San Diego, CA (US)

(72) Inventors: Hee-Seok Lee, Yongin-Si (KR); Duck Hoon Kim, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 15/441,114

(22) Filed: Feb. 23, 2017

(65) Prior Publication Data

US 2018/0189580 A1   Jul. 5, 2018

Related U.S. Application Data

(60) Provisional application No. 62/441,889, filed on Jan. 3, 2017.

(51) Int. Cl.
*G06T 7/00* (2017.01)
*G06K 9/00* (2006.01)
(Continued)

(52) U.S. Cl.
CPC ....... *G06K 9/00818* (2013.01); *G06K 9/4604* (2013.01); *G06K 9/4628* (2013.01); *G06K 9/627* (2013.01); *G06T 7/13* (2017.01); *G06T 7/168* (2017.01); *G06T 7/50* (2017.01); *G06T 2207/20084* (2013.01); *G06T 2207/30252* (2013.01)

(58) Field of Classification Search
CPC .................. G06T 3/00; G06F 17/00

USPC .......................................................... 382/103
See application file for complete search history.

(56) References Cited

U.S. PATENT DOCUMENTS

| 8,379,924 B2* | 2/2013 | Schaufler ........... G06K 9/00791 348/113 |
| 9,286,524 B1* | 3/2016 | Mei ....................... G06K 9/6273 |

(Continued)

FOREIGN PATENT DOCUMENTS

| CN | 104517103 A | 4/2015 |
| CN | 105678318 A | 6/2016 |

OTHER PUBLICATIONS

Wu Y., et al., "Traffic Sign Detection Based on Convolutional Neural Networks", IEEE, Proceedings of International Joint Conference on Neural Networks, Dallas, Texas, USA, Aug. 4-9, 2013, pp. 747-753.

(Continued)

*Primary Examiner* — Abolfazl Tabatabai
(74) *Attorney, Agent, or Firm* — Polsinelli LLP

(57) ABSTRACT

A method, a computer-readable medium, and an apparatus for object detection are provided. The apparatus may determine a regression vector using a neural network based on an input image that contains an object. The object may have a planar surface with a known shape. The apparatus may derive a transform matrix based on the regression vector. The apparatus may identify a precise boundary of the object based on the transform matrix. The precise boundary of the object may include a plurality of vertices of the object. To identify the boundary of the object, the apparatus may apply the transform matrix to a determined shape of the object.

21 Claims, 8 Drawing Sheets

(51) Int. Cl.
  *G06K 9/46*   (2006.01)
  *G06T 7/13*   (2017.01)
  *G06T 7/168*  (2017.01)
  *G06T 7/50*   (2017.01)
  *G06K 9/62*   (2006.01)

(56) References Cited

U.S. PATENT DOCUMENTS 9,418,319 B2 *   8/2016   Shen ................... G06K 9/4628
2018/0005134 A1 *   1/2018   Kish ................... G06N 99/005

OTHER PUBLICATIONS

Baoguang S., et al., "Robust Scene Text Recognition with Automatic Rectification." 2016 IEEE Conference on Computer Vision and Pattern Recognition (CVPR), IEEE, Jun. 27, 2016 (Jun. 27, 2016), pp. 4168-4176, XP033021602, 9 pages, DOI: 10.1109/CVPR.2016.452 [retrieved on Dec. 9, 2016].
International Search Report and Written Opinion—PCT/US2017/066977—ISA/EPO—dated Apr. 9, 2018.
Jaderberg M., et al., "Spatial Transformer Networks." ARXIV.org, Cornell University Library, 201 Olin Library Cornell University Ithaca, NY 14853, Jun. 5, 2015 (Jun. 5, 2015), XP080795056, 14 pages, the whole document.

* cited by examiner

SIMULTANEOUS OBJECT DETECTION AND RIGID TRANSFORM ESTIMATION USING NEURAL NETWORK

CROSS-REFERENCE TO RELATED APPLICATION(S)

This application claims the benefit of U.S. Provisional Application Ser. No. 62/441,889, entitled "SIMULTANEOUS OBJECT DETECTION AND RIGID TRANSFORM ESTIMATION USING NEURAL NETWORK" and filed on Jan. 3, 2017, which is expressly incorporated by reference herein in its entirety.

BACKGROUND

Field

The present disclosure relates generally to machine learning, and more particularly, to objection detection using neural network.

Background

An artificial neural network, which may include an interconnected group of artificial neurons, may be a computational device or may represent a method to be performed by a computational device. Artificial neural networks may have corresponding structure and/or function in biological neural networks. However, artificial neural networks may provide useful computational techniques for certain applications in which conventional computational techniques may be cumbersome, impractical, or inadequate. Because artificial neural networks may infer a function from observations, such networks may be useful in applications where the complexity of the task or data makes the design of the function by conventional techniques burdensome.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

In object detection applications, such as traffic sign detection and mapping for intelligent vehicle, precise boundary (not just bounding box) may need to be identified for localization and mapping accuracy. The precise boundary of a target object may include the vertices of the target object. Conventional object detection methods may use a convolutional neural network (CNN) to detect an object. However, conventional object detection methods may provide a rectangle bounding box of the object, but not the precise boundary of the object. As a result, conventional object detection methods may need to be combined with certain post-processing (e.g., segmentation of the object bounding box, edge detection, or corner detection) in order to estimate the precise boundary of the object. The post-processing may introduce additional computational cost, delay, or other inefficiency.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Conventional object detection methods may provide a rectangle bounding box of the object. Therefore, conventional object detection methods may need to be combined with certain post-processing (e.g., segmentation of the object bounding box, edge detection, or corner detection) in order to estimate the precise boundary of the object. The post-processing may introduce additional computational cost, delay, or other inefficiency.

In an aspect of the disclosure, a method, a computer-readable medium, and an apparatus for object detection are provided. The apparatus may determine a regression vector using a neural network based on an input image that contains an object. The object may have a planar surface with a known shape. The apparatus may derive a transform matrix based on the regression vector. The apparatus may identify a precise boundary of the object based on the transform matrix. The precise boundary of the object may include a plurality of vertices of the object. To identify the boundary of the object, the apparatus may apply the transform matrix to a determined shape of the object.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
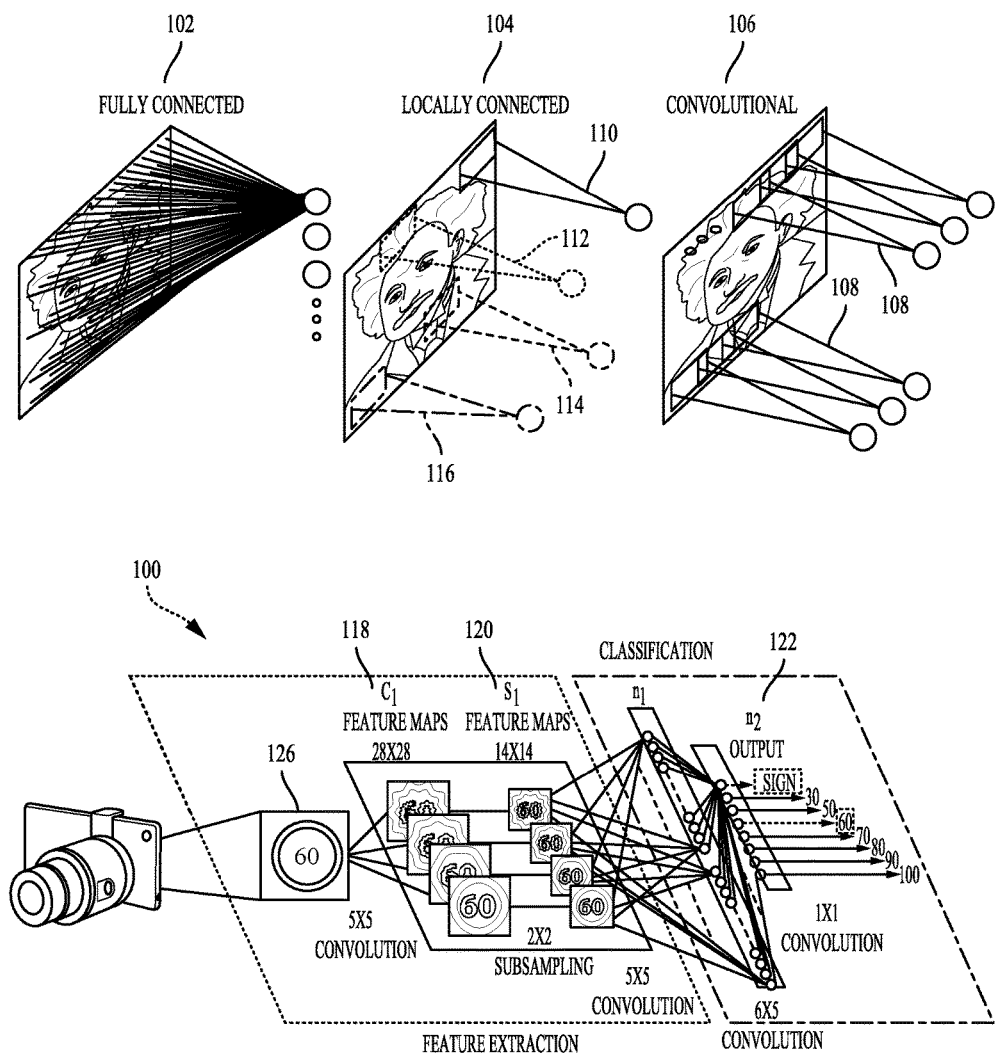
FIG. 1 is a diagram illustrating a neural network in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computing systems for artificial neural networks will now be presented with reference to various apparatus and methods. The apparatus and methods will be described in the following detailed description and illustrated in the accompanying drawings by various blocks, components, circuits, processes, algorithms, etc. (collectively referred to as "elements"). The elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

An artificial neural network may be defined by three types of parameters: 1) the interconnection pattern between the different layers of neurons; 2) the learning process for updating the weights of the interconnections; and 3) the activation function that converts a neuron's weighted input to its output activation. Neural networks may be designed with a variety of connectivity patterns. In feed-forward networks, information is passed from lower to higher layers, with each neuron in a given layer communicating with neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

FIG. 1 is a diagram illustrating a neural network in accordance with aspects of the present disclosure. As shown in FIG. 1, the connections between layers of a neural network may be fully connected 102 or locally connected 104. In a fully connected network 102, a neuron in a first layer may communicate the neuron's output to every neuron in a second layer, so that each neuron in the second layer receives an input from every neuron in the first layer. Alternatively, in a locally connected network 104, a neuron in a first layer may be connected to a limited number of neurons in the second layer. A convolutional network 106 may be locally connected, and is further configured such that the connection strengths associated with the inputs for each neuron in the second layer are shared (e.g., connection strength 108). More generally, a locally connected layer of a network may be configured so that each neuron in a layer will have the same or a similar connectivity pattern, but with connections strengths that may have different values (e.g., 110, 112, 114, and 116). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 100 designed to recognize visual features from a car-mounted camera may develop high layer neurons with different properties depending on their association with the lower portion of the image versus the upper portion of the image. Neurons associated with the lower portion of the image may learn to recognize lane markings, for example, while neurons associated with the upper portion of the image may learn to recognize traffic lights, traffic signs, and the like.

A deep convolutional network (DCN) may be trained with supervised learning. During training, a DCN may be presented with an image, such as a cropped image of a speed limit sign 126, and a "forward pass" may then be computed to produce an output 122. The output 122 may be a vector of values corresponding to features such as "sign," "60," and "100." The network designer may want the DCN to output a high score for some of the neurons in the output feature vector, for example the ones corresponding to "sign" and "60" as shown in the output 122 for a network 100 that has been trained. Before training, the output produced by the DCN is likely to be incorrect, and so an error may be calculated between the actual output of the DCN and the target output desired from the DCN. The weights of the DCN may then be adjusted so that the output scores of the DCN are more closely aligned with the target output.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as the manner of adjusting weights involves a "backward pass" through the neural network.

In practice, the error gradient of weights may be calculated over a small number of examples, so that the calculated gradient approximates the true error gradient. This approximation method may be referred to as a stochastic gradient descent. The stochastic gradient descent may be repeated until the achievable error rate of the entire system has stopped decreasing or until the error rate has reached a target level.

After learning, the DCN may be presented with new images 126 and a forward pass through the network may yield an output 122 that may be considered an inference or a prediction of the DCN.

Deep convolutional networks (DCNs) are networks of convolutional networks, configured with additional pooling and normalization layers. DCNs may achieve state-of-the-art performance on many tasks. DCNs may be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered a three-dimensional network, with two spatial dimensions along the axes of the image and a third dimension capturing color information. The outputs of the convolutional connections may be considered to form a feature map in the subsequent layer 118 and 120, with each element of the feature map (e.g., 120) receiving input from a range of neurons in the previous layer (e.g., 118) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

Figure 2:
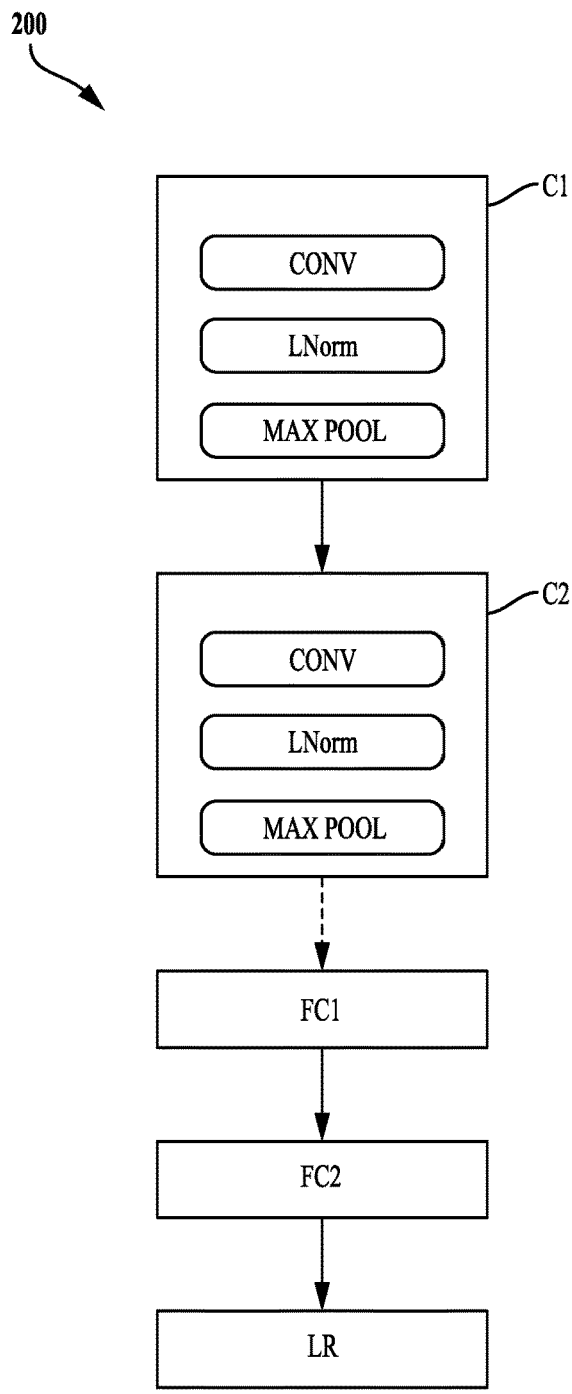
FIG. 2 is a block diagram illustrating an exemplary deep convolutional network (DCN) in accordance with aspects of the present disclosure.

FIG. 2 is a block diagram illustrating an exemplary deep convolutional network 200. The deep convolutional network 200 may include multiple different types of layers based on connectivity and weight sharing. As shown in FIG. 2, the exemplary deep convolutional network 200 includes multiple convolution blocks (e.g., C1 and C2). Each of the convolution blocks may be configured with a convolution layer (CONV), a normalization layer (LNorm), and a pooling layer (MAX POOL). The convolution layers may include one or more convolutional filters, which may be applied to the input data to generate a feature map. Although only two convolution blocks are shown, the present disclosure is not so limiting, and instead, any number of convolutional blocks may be included in the deep convolutional network 200 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU or GPU of an SOC, optionally based on an Advanced RISC Machine (ARM) instruction set, to achieve high performance and low power consumption. In alternative embodiments, the parallel filter banks may be loaded on the DSP or an image signal processor (ISP) of an SOC. In addition, the DCN may access other processing blocks that may be present on the SOC, such as processing blocks dedicated to sensors and navigation.

The deep convolutional network 200 may also include one or more fully connected layers (e.g., FC1 and FC2). The deep convolutional network 200 may further include a logistic regression (LR) layer. Between each layer of the deep convolutional network 200 are weights (not shown) that may be updated. The output of each layer may serve as an input of a succeeding layer in the deep convolutional network 200 to learn hierarchical feature representations from input data (e.g., images, audio, video, sensor data and/or other input data) supplied at the first convolution block C1.

The network 100 or the deep convolutional network 200 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software component executed by a processor, or any combination thereof. The network 100 or the deep convolutional network 200 may be utilized in a large range of applications, such as image and pattern recognition, machine learning, motor control, and the like. Each neuron in the neural network 100 or the deep convolutional network 200 may be implemented as a neuron circuit.

In certain aspects, the network 100 or the deep convolutional network 200 may be configured to determine a regression vector based on an input image that contains an object. The network 100 or the deep convolutional network 200 may also be configured to determine the shape of the object. The operations performed by the network 100 or the deep convolutional network 200 will be described below with reference to FIGS. 3-8.

Figure 3:
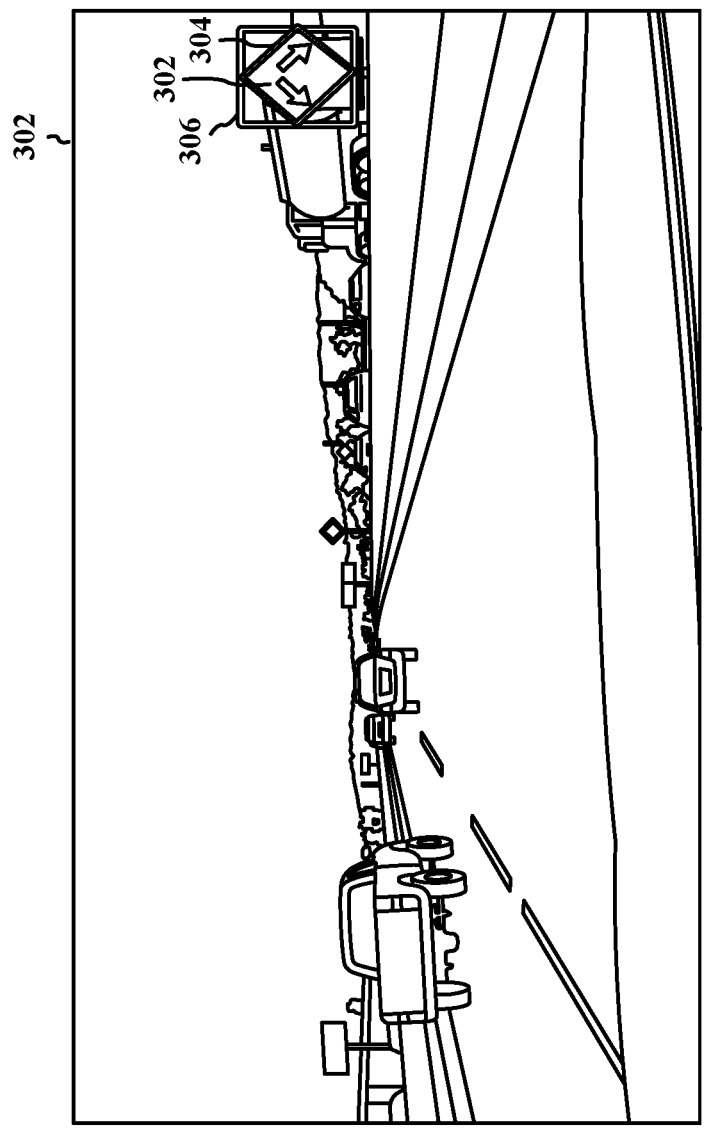
FIG. 3 is a diagram illustrating an example of object detection that provides a precise boundary of the object rather than a bounding box.

FIG. 3 is a diagram 300 illustrating an example of object detection that provides a precise boundary of the object rather than a bounding box. In this example, an image 302 that contains a traffic sign 302 is processed to detect traffic signs. In this application of object detection, a precise boundary of the object (e.g., the traffic sign 302) may need to be identified, e.g., for localization and mapping accuracy.

Conventional methods of object detection may produce a bounding box 306 of the traffic sign 302. In order to estimate the precise boundary 304, conventional methods may perform post-processing on the bounding box 306 (e.g., segmentation of the bounding box 306, edge detection, or corner detection within the bounding box 306). In one configuration of the disclosure, the precise boundary 304 of the traffic sign 302 may be produced directly, without obtaining the bounding box 306 and without performing any post-processing on the bounding box 306.

Figure 4:
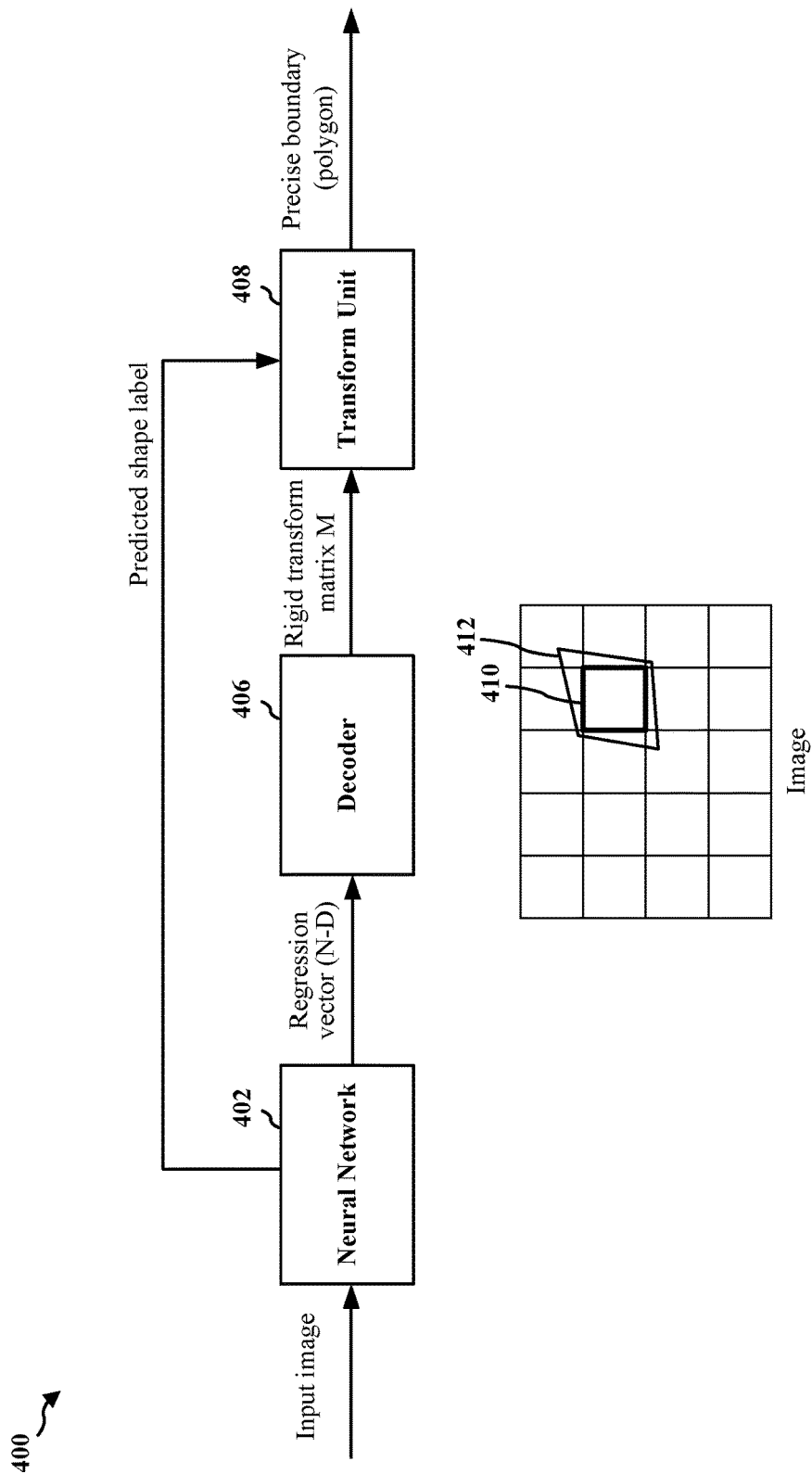
FIG. 4. is a diagram illustrating an example of an object detection network for simultaneous object detection and rigid transform estimation using a neural network.

FIG. 4. is a diagram illustrating an example of an object detection network 400 for simultaneous object detection and rigid transform estimation using a neural network. In the example, the object detection network 400 may include a neural network 402, a decoder 406, and a transform unit 408. In one configuration, the neural network 402 may be a CNN.

The neural network 402 may receive an input image that contains a target object (e.g., a traffic sign). The neural network 402 may generate a regression vector based on the input image. In one configuration, the neural network 402 may also generate a predicted shape label (e.g., triangle or diamond) of the target object. In one configuration, the regression vector and the shape label may be generated by different convolutional layers of the neural network 402. In one configuration, the regression vector and the shape label may be generated by two different neural networks with the same input image.

In one configuration, instead of generating the predicted shape label, a neural network (e.g., the neural network 402) may generate a predicted content of the target object. The predicted content (e.g., traffic sign content) may be associated with a shape. As a result, in addition to predicting the shape of the target object, the content associated with the target object may also be estimated.

In one configuration, the number of dimensions of the regression vector may be different depending on the type of transform to be performed. For example, the regression vector may have four dimensions for a similarity transform (4-degree of freedom), the regression vector may have six dimensions for an affine transform (6-degree of freedom), the regression vector may have eight dimensions for a perspective transform (homography, 8-degree of freedom).

In one configuration, the dimension of the regression vector may be pre-determined for both training and testing of the neural network 402. In one configuration, the number of dimensions of the regression vector may be determined before the training of the neural network 402 based on the application of the object detection network 400. In one configuration, all regression vectors generated by the neural network 402 may have the same number of dimensions.

The decoder 406 may decode the regression vector to obtain a rigid transform matrix M. A rigid transformation of a vector space preserves distances between every pair of points. The rigid transformations may include rotations, translations, reflections, or some combination of rotations, translations, and/or reflections. In one configuration, the regression vector may represent the difference between the predicted template vertices (e.g., predicted template vertices 412) and an anchor box (e.g., anchor box 410) of the neural network. An anchor box (e.g., the anchor box 410) may be a part of image region given by a pre-defined regular grid. The template vertices (e.g., the predicted template vertices 412) may be four corners of a template image. The template vertices may be independent from contents of the template image. For each anchor box, a regression vector may be obtained to represent the difference between the predicted template vertices and the anchor box. The regression vector may be encoded using coordinates of four vertices (e.g., (0, 0), (1, 0), (1, 1), (0, 1)), as will be described further below.

The rigid transform matrix may represent a rigid transformation from the template polygon to the precise boundary (e.g., vertices in the precise boundary 304) of the target object in the image. A template polygon may include the actual corners/vertices of a target object (e.g., 8 corners of a stop sign).

In one configuration, Lie algebra sl(3) of a transform perspective matrix SL(3) may be used to represent a 8-dimensional (8D) transform matrix. The regress 8D coefficient vector may be applied to sl(3) (derivatives are well defined) and the transform matrix SL(3) may be calculated by using a matrix exponent, as defined below, $$M(u) = M \cdot \exp(\Sigma_i u_i E_i)$$

where,
M transform matrix of anchor box (only translation of rectangle),
M(u): updated transform matrix by regression,
$u_i$: i-th regression vector element (coefficient of sl(3)),
$E_i$: i-th element of Lie algebra basis of SL(3).

In one configuration, the transform matrix may be decoded using coordinates of four vertices. The regress translation vector for four pre-defined control points (e.g., (0, 0), (1, 0), (1, 1), (0, 1)) may be obtained by the neural network 402, the transform matrix may be calculated using the vertices by solving a linear equation $$\begin{bmatrix} x_1 & y_1 & 1 & 0 & 0 & 0 & -x_1 x'_1 & -y_1 x'_1 \\ 0 & 0 & 0 & x_1 & y_1 & 1 & -x_1 y'_1 & -y_1 y'_1 \\ x_2 & y_2 & 1 & 0 & 0 & 0 & -x_2 x'_2 & -y_2 x'_2 \\ 0 & 0 & 0 & x_2 & y_2 & 1 & -x_2 y'_2 & -y_2 y'_2 \\ x_3 & y_3 & 1 & 0 & 0 & 0 & -x_3 x'_3 & -y_3 x'_3 \\ 0 & 0 & 0 & x_3 & y_3 & 1 & -x_3 y'_3 & -y_3 y'_3 \\ x_4 & y_4 & 1 & 0 & 0 & 0 & -x_4 x'_4 & -y_4 x'_4 \\ 0 & 0 & 0 & x_4 & y_4 & 1 & -x_4 y'_4 & -y_4 y'_4 \end{bmatrix} \begin{bmatrix} h_{11} \\ h_{12} \\ h_{13} \\ h_{21} \\ h_{22} \\ h_{23} \\ h_{31} \\ h_{32} \end{bmatrix} = \begin{bmatrix} x'_1 \\ y'_1 \\ x'_2 \\ y'_2 \\ x'_3 \\ y'_3 \\ x'_4 \\ y'_4 \end{bmatrix}$$

$$\text{for } M = \begin{bmatrix} h_{11} & h_{12} & h_{13} \\ h_{21} & h_{22} & h_{23} \\ h_{31} & h_{32} & h_{33} \end{bmatrix}$$

where,
x, y: vertices in template image,
x', y': vertices in image.

The transform unit 408 may determine a template polygon based on the predicted shape label, and transform the template polygon using the rigid transform matrix M to obtain the precise boundary of the target object (e.g., the vertices of the target object).

In one configuration, the precise boundary of the target object may be obtained without any post-processing such as segmentation of an object bounding box, edge detection, or corner detection, etc. As a result, the estimation time of the precise boundary (e.g., vertices) may be reduced, and the estimation of precise boundary may be more accurate as well. Because the vertices of the target object are directly estimated using the transform matrix generated by the CNN, occlusion and/or overlapped targets within the input image may also be handled. In contrast, obtaining the precise boundary of the target object using post-processing cannot handle occlusion and/or overlapped targets within the input image. Therefore, when there is occlusion and/or overlapped targets within the input image, the precise boundary of the target object estimated using post-processing of an object bounding box may be less accurate than the method described in this disclosure. Moreover, the method described in this disclosure for identifying precise boundary of target object may be more effective in handling small and blurry target objects than obtaining the precise boundary of the target object using post-processing.

Figure 5:
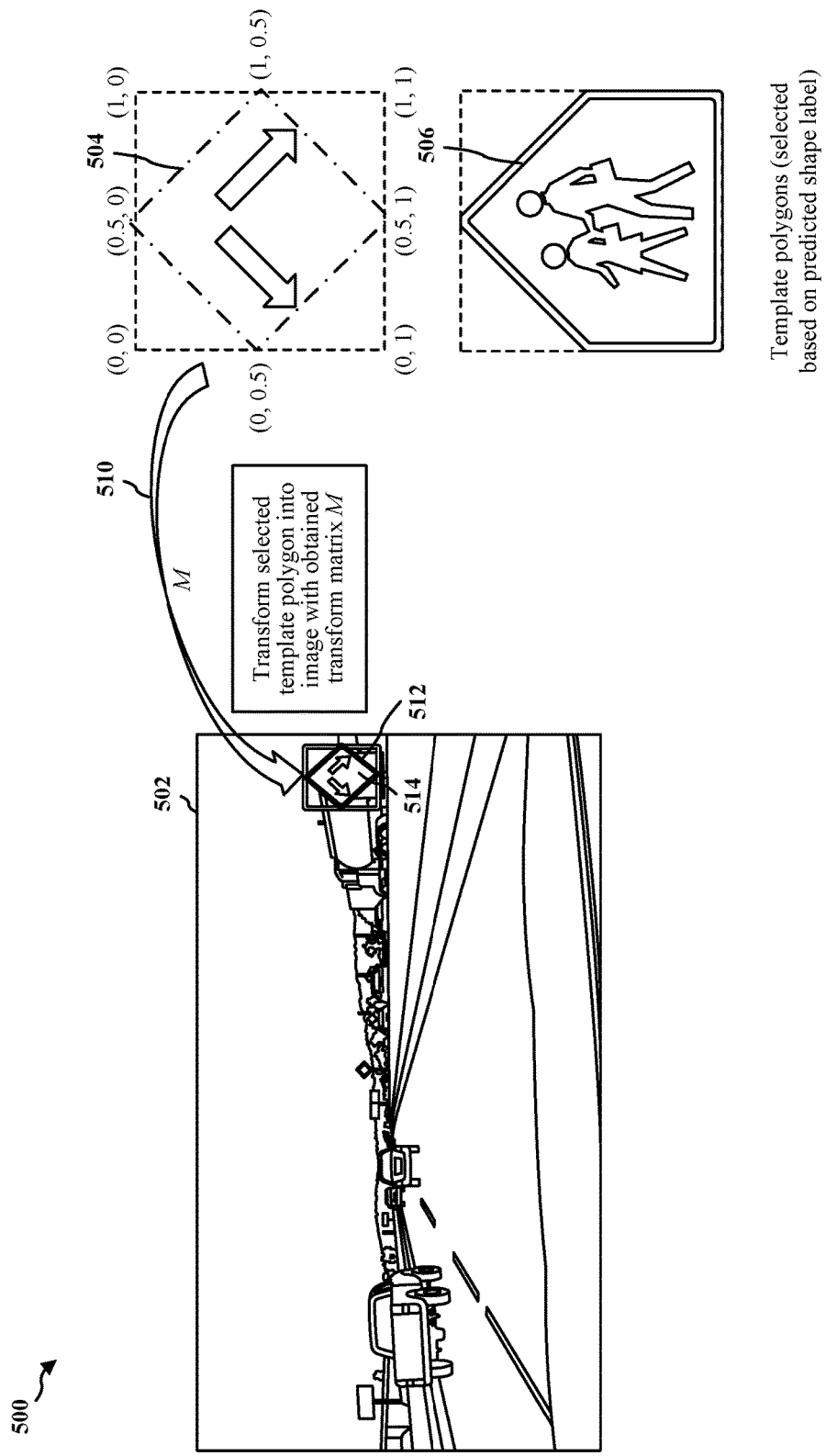
FIG. 5 is a diagram illustrating an example of transforming a template polygon into an image with a transform matrix obtained through the object detection network described above in FIG. 4.

FIG. 5 is a diagram 500 illustrating an example of transforming a template polygon into an image 502 with a transform matrix M obtained through the object detection network 400 described above in FIG. 4. In one configuration, the operations described in this example may be performed by the transform unit 408 described above with reference to FIG. 4. The transform matrix M may be the rigid transform matrix M produced by the decoder 406.

In one configuration, the image 502 containing the target object 514 (e.g., a traffic sign) may be provided to an object detection network (e.g., the object detection network 400) to generate the transform matrix M and a predicted shape label for the target object 514. Based on the predicted shape label (e.g., diamond shape), a template polygon 504 may be selected from a plurality of pre-defined template polygons that may include template polygons 504, 506, etc. The template polygon 504 may include vertices (0.5, 0), (1, 0.5), (0.5, 1), and (0, 0.5). The template vertices may be (0, 0), (1, 0), (1, 1), and (0, 1).

The selected template polygon 504 may be transformed (at 510) into the image 502 using the transform matrix M. By applying the transform matrix M to the vertices of the selected template polygon 504, the vertices of the target object 514 in the image 502 may be obtained. Thus, the precise boundary 512 of the target object 514 in the image 502 may be identified.

Figure 6:
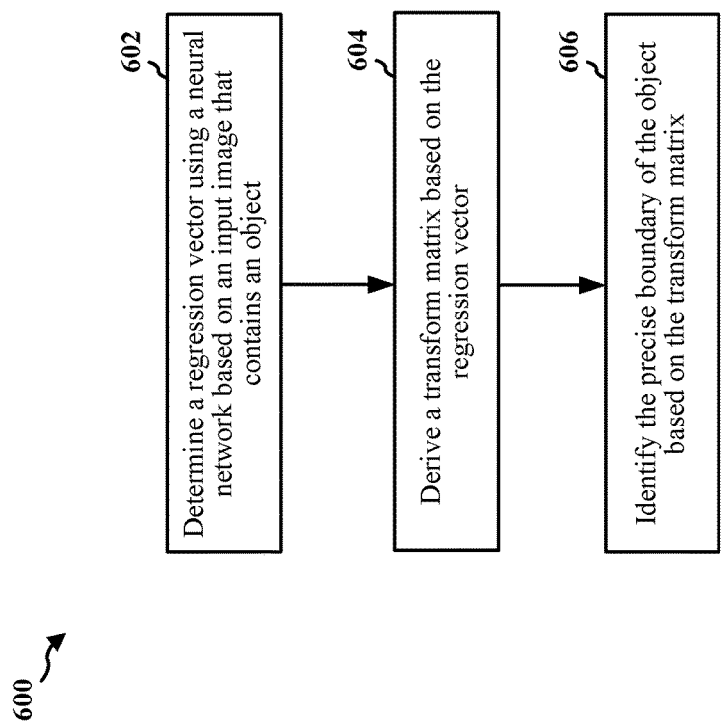
FIG. 6 is a flowchart of a method of object detection using a neural network.

FIG. 6 is a flowchart 600 of a method of object detection using a neural network. In one configuration, the neural network may be a deep convolutional neural network (DCN). The method may be performed by a computing device (e.g., the apparatus 702/702'). At 602, the device may determine a regression vector using the neural network based on an input image containing an object (e.g., a traffic sign). In one configuration, operations performed at 602 may include the operations performed by the neural network 402 described above with reference to FIG. 4. In one configuration, the regression vector may include 6 dimensions for an affine transform. In one configuration, the regression vector may include 8 dimensions for a perspective transform. In one configuration, the object may have a planar surface with a known shape. In such a configuration, there may be a pre-defined list of shapes, and the shape of the object is in the pre-defined list.

At 604, the device may derive a transform matrix based on the regression vector. In one configuration, operations performed at 604 may include the operations performed by the decoder 406 described above with reference to FIG. 4.

At 606, the device may identify the precise boundary of the object based on the transform matrix. In one configuration, operations performed at 606 may include the operations performed by the transform unit 408 described above with reference to FIG. 4. In one configuration, the boundary of the object may include a plurality of vertices of the object. In one configuration, to identify the boundary of the object, the device may apply the transform matrix to a predicted shape of the object, e.g., performing a matrix multiplication between the vector representing the vertices of the predicted shape and the transform matrix. The shape of the object may be unrelated to the size of the object and the boundary of the object may be related to the size of the object. In one configuration, the shape of the object may be determined by the neural network. The shape of the object may be the shape of a specific object class comprising a plurality of vertex coordinates stored in a database. The object class may be determined by the neural network. In one configuration, the boundary of the object may be identified without performing any additional processing (e.g., one or more of segmentation of the object, edge detection, or corner detection) after the transform matrix is applied to the predicted shape of the object.

Figure 7:
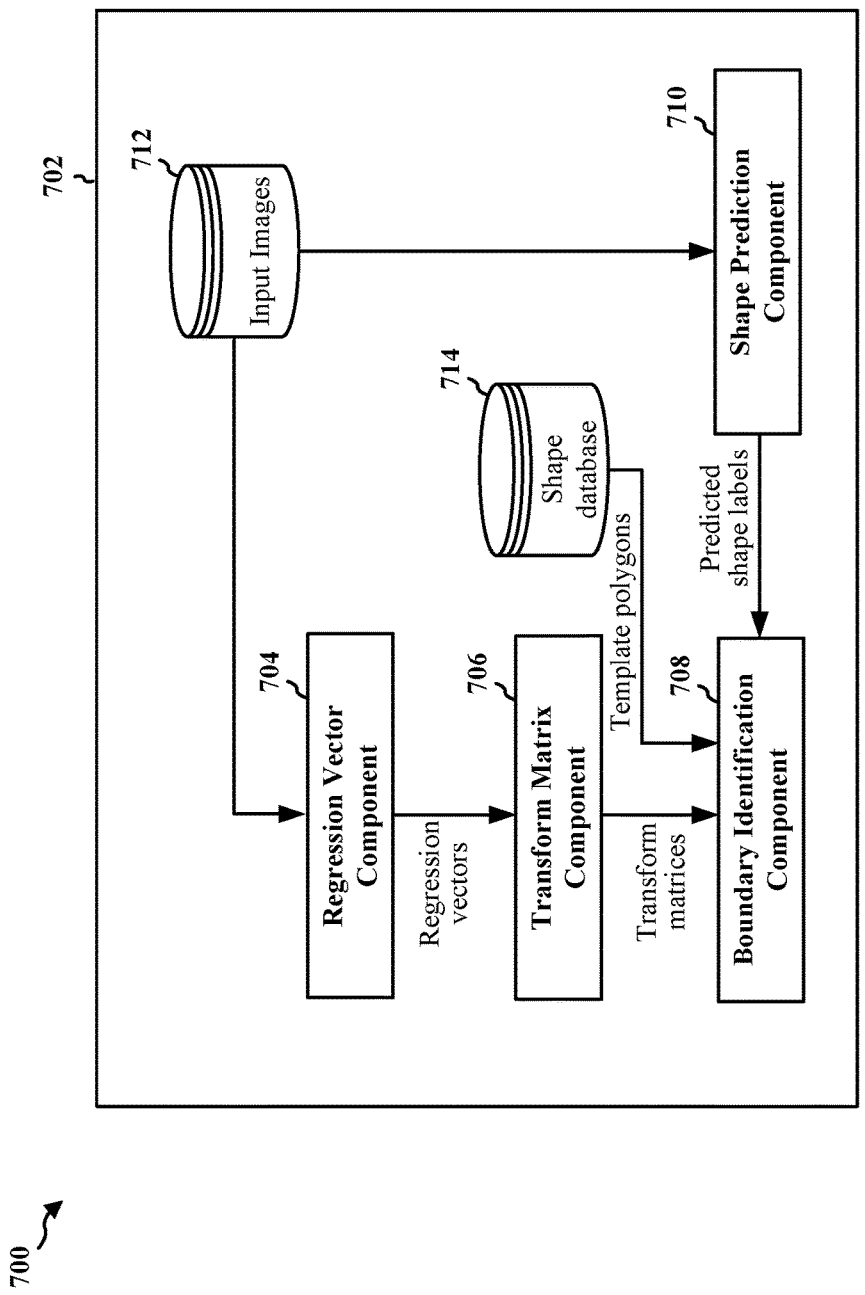
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus 702 may be a computing device.

The apparatus 702 may include a regression vector component 704 that determines regression vectors using a neural network based on input images 712. In one configuration, the regression vector component 704 may perform operations performed by the neural network 402 described above with reference to FIG. 4. In one configuration, the regression vector component 704 may perform operations described above with reference to 602 in FIG. 6.

The apparatus 702 may include a shape prediction component 710 that predicts shape labels for target objects using a neural network based on input images 712. In one configuration, the shape prediction component 710 may perform operations performed by the neural network 402 described above with reference to FIG. 4.

The apparatus 702 may include a transform matrix component 706 that receives regression vectors from the regression vector component 704 and derives transform matrices based on the regression vectors. In one configuration, the transform matrix component 706 may perform the operations described above with reference to 604 in FIG. 6. In one configuration, the transform matrix component 706 may perform operations performed by the decoder 406 described above with reference to FIG. 4.

The apparatus 702 may include a boundary identification component 708 that receives the transform matrices from the transform matrix component 706. The boundary identification component 708 may further receive predicted shape labels from the shape prediction component 710 and query a shape database 714 to map the predicted shape labels to actual shapes (e.g., template polygons). The boundary identification component 708 may identify precise boundaries of target objects based on the transform matrices and the template polygons. In one configuration, the boundary identification component 708 may perform the operations described above with reference to 606 in FIG. 6. In one configuration, the boundary identification component 708 may perform operations performed by the transform unit 408 described above with reference to FIG. 4.

The apparatus 702 may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
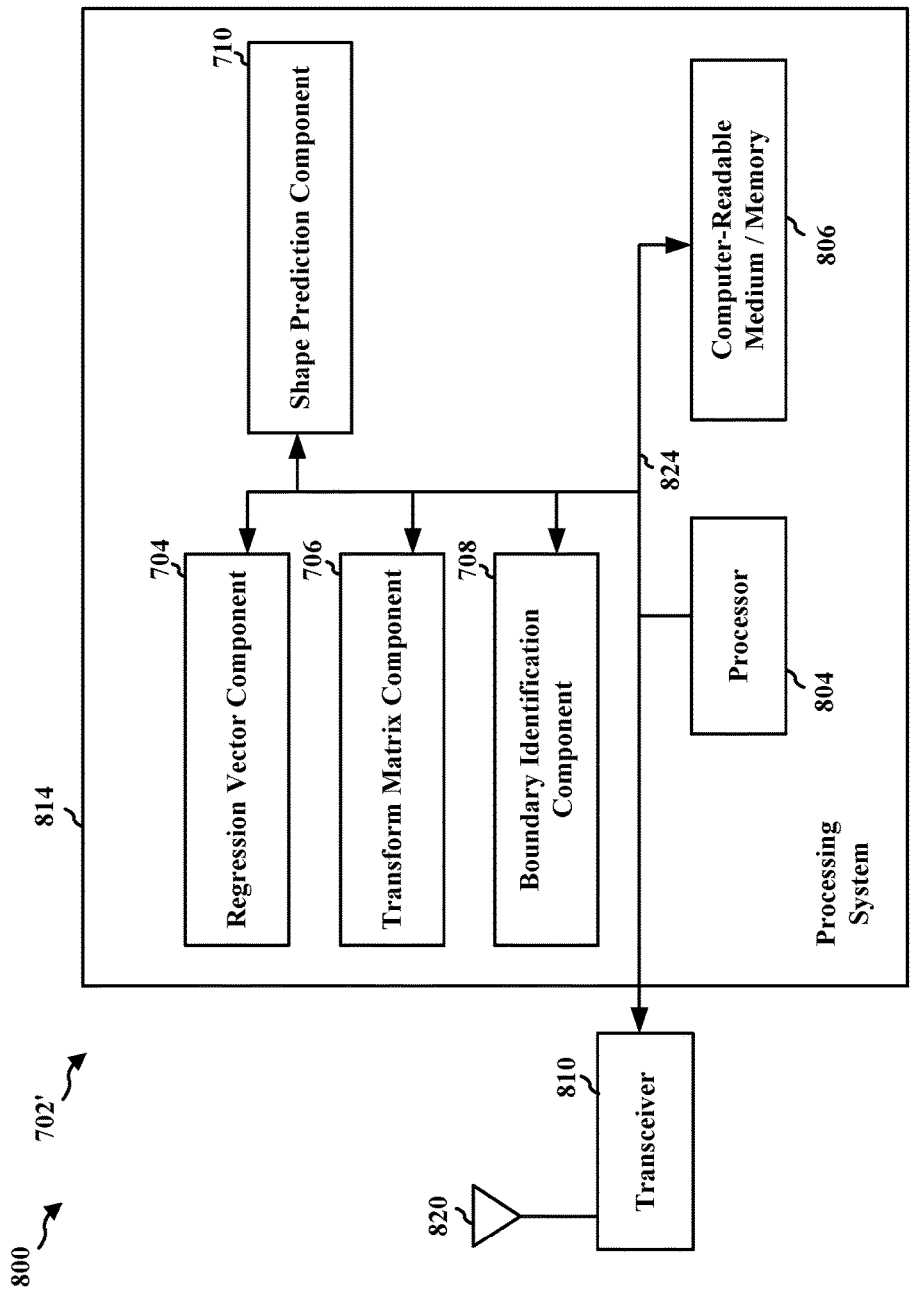
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 may be coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814. In addition, the transceiver 810 receives information from the processing system 814, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710. The components may be software components running in the processor 804, resident/stored in the computer readable medium/memory 806, one or more hardware components coupled to the processor 804, or some combination thereof.

In one configuration, the apparatus 702/702' may include means for determining a regression vector using a neural network based on an input image comprising an object. In one configuration, the means for determining a regression vector may perform the operations described above with reference to 602 in FIG. 6. In one configuration, the means for determining a regression vector may include the regression vector component 704 and/or the processor 804.

In one configuration, the apparatus 702/702' may include means for deriving a transform matrix based on the regression vector. In one configuration, the means for deriving a transform matrix based on the regression vector may perform the operations described above with reference to 604 in FIG. 6. In one configuration, the means for deriving a transform matrix based on the regression vector may include the transform matrix component 706 and/or the processor 804.

In one configuration, the apparatus 702/702' may include means for identifying a boundary of the object based on the transform matrix. In one configuration, the means for identifying a boundary of the object based on the transform matrix may perform operations described above with reference to 606 in FIG. 6. In one configuration, the means for identifying a boundary of the object based on the transform matrix may include the boundary identification component 708 and/or the processor 804.

In one configuration, the means for identifying the boundary of the object may be configured to apply the transform matrix to a shape of the object. In one configuration, the means for identifying the boundary of the object may not perform any additional processing after the transform matrix is applied to the shape of the object.

The aforementioned means may be one or more of the aforementioned components of the apparatus 702 and/or the processing system 814 of the apparatus 702' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of object detection, comprising:
   determining, using a neural network, a regression vector based on an input image comprising an object;
   determining, using the neural network, a shape of the object;
   deriving a transform matrix based on the regression vector;
   applying the transform matrix to the shape of the object; and
   identifying, without performing edge detection or corner detection, a boundary of the object after the transform matrix is applied to the shape of the object.

2. The method of claim 1, wherein the boundary of the object comprises a plurality of vertices of the object.

3. The method of claim 1, wherein the regression vector comprises 6 dimensions for an affine transform.

4. The method of claim 1, wherein the regression vector comprises 8 dimensions for a perspective transform.

5. The method of claim 1, wherein the object has a planar surface with a known shape.

6. The method of claim 5, wherein the object is a traffic sign.

7. The method of claim 1, wherein identifying the boundary of the object comprises identifying, without performing segmentation of the object, the boundary of the object after the transform matrix is applied to the shape of the object.

8. An apparatus for object detection, comprising:
   means for determining, using a neural network, a regression vector based on an input image comprising an object;
   means for determining, using the neural network, a shape of the object
   means for deriving a transform matrix based on the regression vector;
   means for applying the transform matrix to the shape of the object; and
   means for identifying, without performing edge detection or corner detection, a boundary of the object after the transform matrix is applied to the shape of the object.

9. The apparatus of claim 8, wherein the boundary of the object comprises a plurality of vertices of the object.

10. The apparatus of claim 8, wherein the regression vector comprises 6 dimensions for an affine transform.

11. The apparatus of claim 8, wherein the regression vector comprises 8 dimensions for a perspective transform.

12. The apparatus of claim 8, wherein the object has a planar surface with a known shape.

13. The apparatus of claim 8, wherein the means for identifying the boundary of the object is configured to identify, without performing segmentation of the object, the boundary of the object after the transform matrix is applied to the shape of the object.

14. An apparatus for object detection, comprising:
   a memory; and
   at least one processor coupled to the memory, wherein the at least one processor is configured to:
      determine, using a neural network, a regression vector based on an input image comprising an object;
      determine, using the neural network, a shape of the object;
      derive a transform matrix based on the regression vector;
      apply the transform matrix to the shape of the object; and
      identify, without performing edge detection or corner detection, a boundary of the object after the transform matrix is applied to the shape of the object.

15. The apparatus of claim 14, wherein the boundary of the object comprises a plurality of vertices of the object.

16. The apparatus of claim 14, wherein the regression vector comprises 6 dimensions for an affine transform.

17. The apparatus of claim 14, wherein the regression vector comprises 8 dimensions for a perspective transform.

18. The apparatus of claim 14, wherein the object has a planar surface with a known shape.

19. The apparatus of claim 18, wherein the object is a traffic sign.

20. The apparatus of claim 14, wherein to identify the boundary of the object, the at least one processor is configured to identify, without performing segmentation of the object, the boundary of the object after the transform matrix is applied to the shape of the object.

21. A non-transitory computer-readable medium having code stored thereon that, when executed, causes at least one processor to:
   determine, using a neural network, a regression vector based on an input image comprising an object;
   determine using the neural network, a shape of the object;
   derive a transform matrix based on the regression vector;
   apply the transform matrix to the shape of the object; and
   identify, without performing edge detection or corner detection, a boundary of the object after the transform matrix is applied to the shape of the object.

* * * * *